US007340084B2

(12) United States Patent
Hamid

(10) Patent No.: US 7,340,084 B2
(45) Date of Patent: Mar. 4, 2008

(54) QUALITY ASSESSMENT OF PRODUCT IN BULK FLOW

(75) Inventor: Gabriel Hamid, Loughton (GB)

(73) Assignee: Sortex Limited, London (GB)

( * ) Notice: Subject to any disclaimer, the term of this patent is extended or adjusted under 35 U.S.C. 154(b) by 468 days.

(21) Appl. No.: 10/243,128

(22) Filed: Sep. 13, 2002

(65) Prior Publication Data

US 2004/0052402 A1 Mar. 18, 2004

(51) Int. Cl.
*G06K 9/00* (2006.01)
*H04N 7/18* (2006.01)
*H04N 9/47* (2006.01)
*G06F 19/00* (2006.01)

(52) U.S. Cl. ...................... 382/141; 382/100; 382/110; 348/86; 348/125; 700/95

(58) Field of Classification Search ........ 382/100–101, 382/110, 141–143, 151–152; 348/86–92, 348/125–130; 700/95–212
See application file for complete search history.

(56) References Cited

U.S. PATENT DOCUMENTS 4,020,346 A * 4/1977 Dennis ........................ 378/57
4,513,868 A 4/1985 Culling et al.
5,013,927 A * 5/1991 Tsikos et al. ............... 356/625
5,165,520 A * 11/1992 Herve et al. ............. 198/460.1
5,321,764 A * 6/1994 Cullen et al. ............... 382/110
5,473,703 A * 12/1995 Smith ......................... 382/143
5,659,624 A * 8/1997 Fazzari et al. .............. 382/110
5,692,621 A 12/1997 Davis et al.
5,917,927 A * 6/1999 Satake et al. ............... 382/110
5,973,286 A * 10/1999 Wan ........................... 209/582
6,477,266 B1 * 11/2002 Asar .......................... 382/147
6,483,935 B1 * 11/2002 Rostami et al. ............. 382/141

FOREIGN PATENT DOCUMENTS

EP 0672468 9/1995
GB 2333628 A 7/1999
JP 2002-312762 10/2002
WO WO 94/06092 3/1994
WO 03/012438 A2 2/2003

OTHER PUBLICATIONS

International Search Report, corresponding PCT application No. PCT/GB03/03899, International Searching Authority, European Patent Office, Dec. 12, 2003, 4 pages.

* cited by examiner

*Primary Examiner*—Bhavesh M Mehta
*Assistant Examiner*—Manav Seth
(74) *Attorney, Agent, or Firm*—Davis Wright Tremaine LLP

(57) ABSTRACT

A method is disclosed for generating data relating to the quality of product in a bulk stream product during its passage through a monitoring station. An inspection of at least a portion of product in the monitoring station is conducted at intervals while the stream is owing. The inspectors identities individual product pieces in the portion being inspected by using one or more of various techniques. Those individual pieces are then examined according to chosen criteria, and a measure is established of the quantity or proportion of such individual product pieces that fail to meet those criteria. The data generated by these inspections can be analysed to provide an indication of the quality of the bulk stream.

50 Claims, 2 Drawing Sheets

2C

2B

2A

QUALITY ASSESSMENT OF PRODUCT IN BULK FLOW

BACKGROUND TO THE INVENTION

This invention relates to the quality assessment of product in bulk flow, and particularly to a method generating data relating to the quality of the product in a bulk stream on a food processing system. The system is typically one or both of sorting or packaging. Such a sorting process is described in U.S. Pat. No. 4,513,868 (Culling et al). Other applications include distribution and warehousing.

Techniques for sorting products in bulk flow are well established, and typically include a viewing station where reject product is identified, and an ejection station where such reject product is removed from the product stream. However, whereas such sorting removes unacceptable product from the stream, there is additional valuable information to be had regarding the nature of product in the stream, which is itself quite acceptable. For example, some damaged or undersize product can be quite acceptable in the final stream, but it is nevertheless of value to have an indication of what proportion of the final product stream that product forms, as it could in turn provide an indication of the performance of treatment apparatus at an earlier stage in the process. This is particularly applicable to rice, where poor performance of the machinery removing the husks can result in an undesirably high number of broken grains, and errors in storage can result in a higher proportion of cracked grains. The present invention has particularly, but not exclusive application to the quality assessment of rice in bulk flow in a food processing plant, especially in association with the processing stage in which the rice is sorted, with reference to both input and output streams.

In known techniques for the inspection and analysis of a bulk stream of product, samples are taken from the product stream and individual product pieces are mechanically separated from one another in the sample for inspection. This requires the use of additional machinery in the processing equipment. The present invention seeks to provide a means by which such inspection and analysis can be conducted with minimal interference with the related processing equipment.

SUMMARY OF THE INVENTION

In accordance with the present invention, in a method of generating data relating to the quality of product in a bulk stream of product during its passage through a monitoring station, an inspection of at least a portion of product in the monitoring station is conducted at intervals while the stream is flowing. The inspection identifies individual product pieces in the selected portion, and examines those individual pieces according to chosen criteria. The number of such individual product pieces that fail to meet these criteria, as a proportion of the total number of identified individual product pieces in the selected portion, provides a useful indication of the quality of the product stream and as noted above, sometimes a guide as to the performance of treatment apparatus in a food processing system. Data generated by such inspection is analysed to provide an indication of the quality of the bulk stream. The method can be used in a variety of sorting processes, with the bulk stream of product being on a conveyor belt, on a chute, or even in free flight during its passage through the monitoring station. The inspection can be conducted while the bulk stream is at full flow rate, although in some circumstances it may need to be reduced temporarily. A typical reduction in these circumstances is in the range of 0 to 80% or 90%. However, any rate reduction is desirably kept to a minimum, as of course it does disrupt the overall processing of the product being considered.

Inspection of product in a product stream in methods of the invention is accomplished by creating an image or snapshot of the respective portion. The image is analysed to identify individual pieces which are to be assessed according to the chosen criteria. This assessment can be accomplished using known image processing technology to establish damage to product pieces and/or whether inherent characteristics of the pieces such as features of colour, size, mass and shape, meet the chosen criteria. In such as analysis, individual product pieces can be identified by mapping outline profiles, and relating them to pre-set guidelines. One pre-set guideline might require a continuous outline with no concavities, which can be useful for rice. This provides a means of distinguishing individual rice grains from conjoined or overlapping grains for which the outline profile will often include at least one concavity. However, image processing techniques can effectively separate individual grains from such conjoined or overlapping grains for assessment. Another might be sample area and a figure for mass derived therefrom. Where dimensions are taken, a dimension in the direction of passage of the bulk stream through the monitoring station must be calculated. A preferred technique uses a linescan camera, in the use of which the measurement in the direction of flow depends upon the speed of the product stream, the linescan rate, and the effective size of the pixels. Using such a technique the length of individual pieces may be determined with reference to a comparison of measurements taken along and transverse to the direction of passage through the monitoring station.

The inspection conducted in methods according to the invention will normally be repeated at intervals while the product stream is flowing. The or each inspection can comprise the creation of any number of images of portions of product in the monitoring station, the results of which are then rapidly analysed, to provide a substantially contemporaneous indication of the quality of product in the stream.

The analysis can count or assess the number of individual product pieces identified in the portion or portions of product inspected which fail to meet the chosen criteria, and this figure can be used to estimate the proportion of such product pieces in the entire bulk stream. In making this estimation, adjustments may be made to take account of a variety of factors; particularly the number of individual product pieces identified. This can depend upon the bulk flow rate, and it is sometimes necessary to reduce the flow rate in order to ensure that a sufficient number of individual product pieces are identified for assessment.

As noted above, many product sorting machines use inspection techniques for determining which products are to be rejected. Such techniques are disclosed in U.S. Pat. No. 4,513,868 (referred to above) and U.S. Pat. No. 5,692,621. The hardware used to apply these techniques can be adapted to provide the information required for the practice of the present invention, in addition to that needed for sorting. However, as the method of the present invention is not itself part of a sorting process, its precise location in the path of a bulk stream of products is not critical.

A particularly preferred application of the present invention is in the quality assessment of a bulk stream of rice grains, within or separate from a sorting process. In one known rice sorting mechanism product is delivered to a sorting station from a chute around 30 cm wide, and along which rice flows at rates of up to 10,000 Kilograms per hour. The rice is in free flight as it enters the sorting station, and the quality of the rice in the stream can be judged using the method of the present invention on the basis of data generated upstream, in, or downstream of the sorting station.

It will be appreciated from the above that the invention provides a means of generating data that can have a variety of uses. A quality evaluation on a particular machine may be displayed or merely logged for future reference. It may be used to activate some form of warning or alarm if it falls below a certain level. It may also be used as an indication of the state of processing at an earlier stage. Users of the invention can choose the purpose to which the information is put.

BRIEF DESCRIPTION OF THE FIGURES

The invention will now be described by way of example and with reference to the accompanying schematic drawings wherein.

DESCRIPTION OF THE PREFERRED EMBODIMENTS

Figure 1:
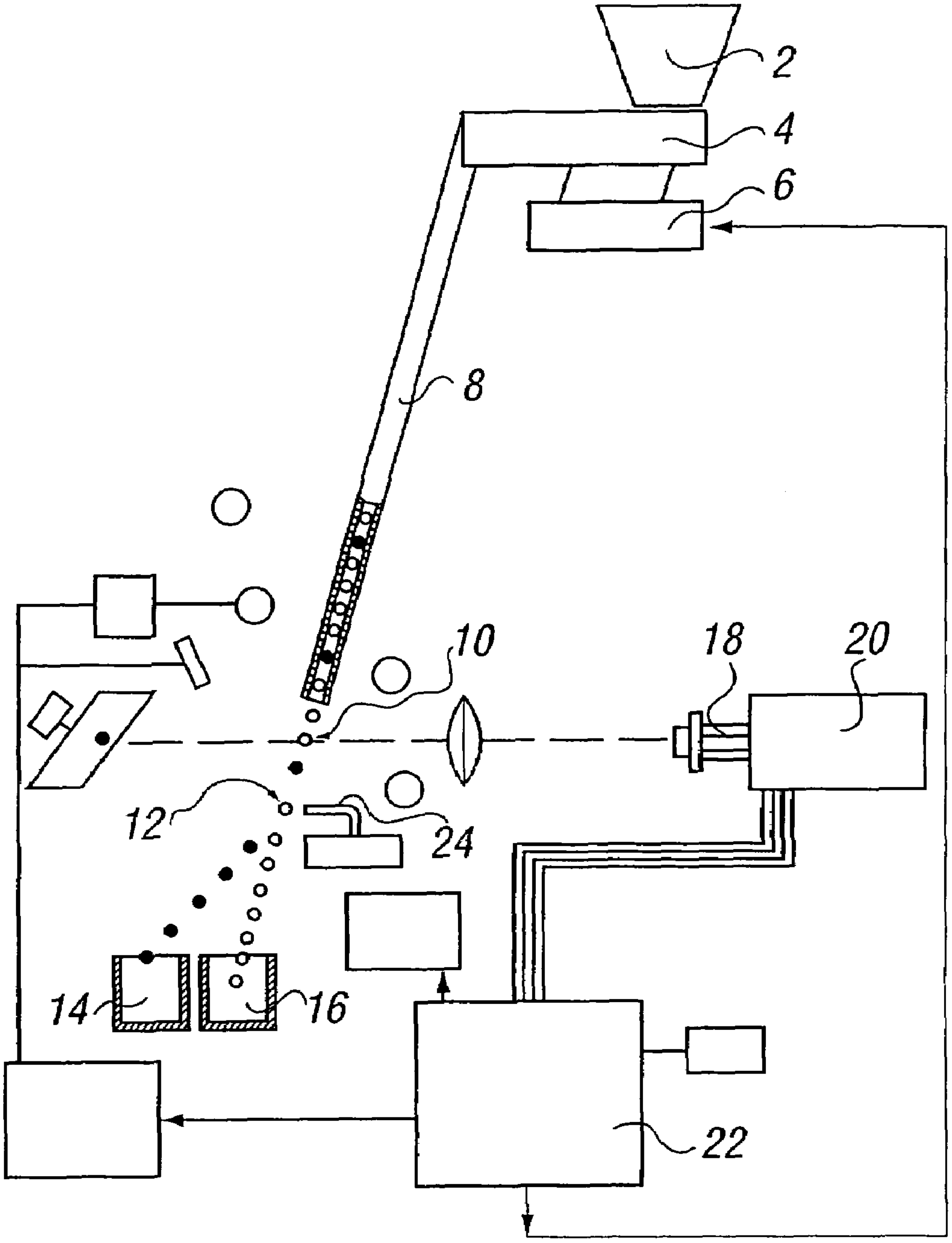
FIG. 1 illustrates a sorting process using inspection techniques.

In the process illustrated in FIG. 1, rice from a hopper 2 is delivered to a tray 4 coupled to a vibrator 6. The rice grains are thereby progressively delivered to the chute 8 down which they fall by gravity and from which they discharge into free fall to a sorting station 10. As the rice grains pass through the sorting station they are under continuous scrutiny by the system 20, which determines which of the grains are to be subsequently removed from the product stream at the ejector station 12. Removed grains are deflected into a "reject" bin 14. The grains not ejected continue into an "accept" bin 16.

The system 20 at the sorting station 10 comprises a plurality of detectors 18, which monitor light received from around or reflected from the face of rice grains in the sorting station. Each detector receives light only from a section of the product stream area in this sorting station.

The detectors 18 are connected to a processor 22, which instructs ejectors 24 at the ejector station to remove or "reject" unacceptable rice grains from the product stream. This system is essentially that described in U.S. Pat. No. 4,513,868. In an application of the present invention to that particular situation the "reject" instruction would apply only to those grains that are discoloured or exhibit some blemish which renders them unacceptable. Grains which are merely mis-shapen, broken, undersize for example, would not necessarily be rejected. However, the processor 22 will monitor those grains, and this information is the basis for assessing the quality of sorted product, in accordance with the present invention.

Figure 2:
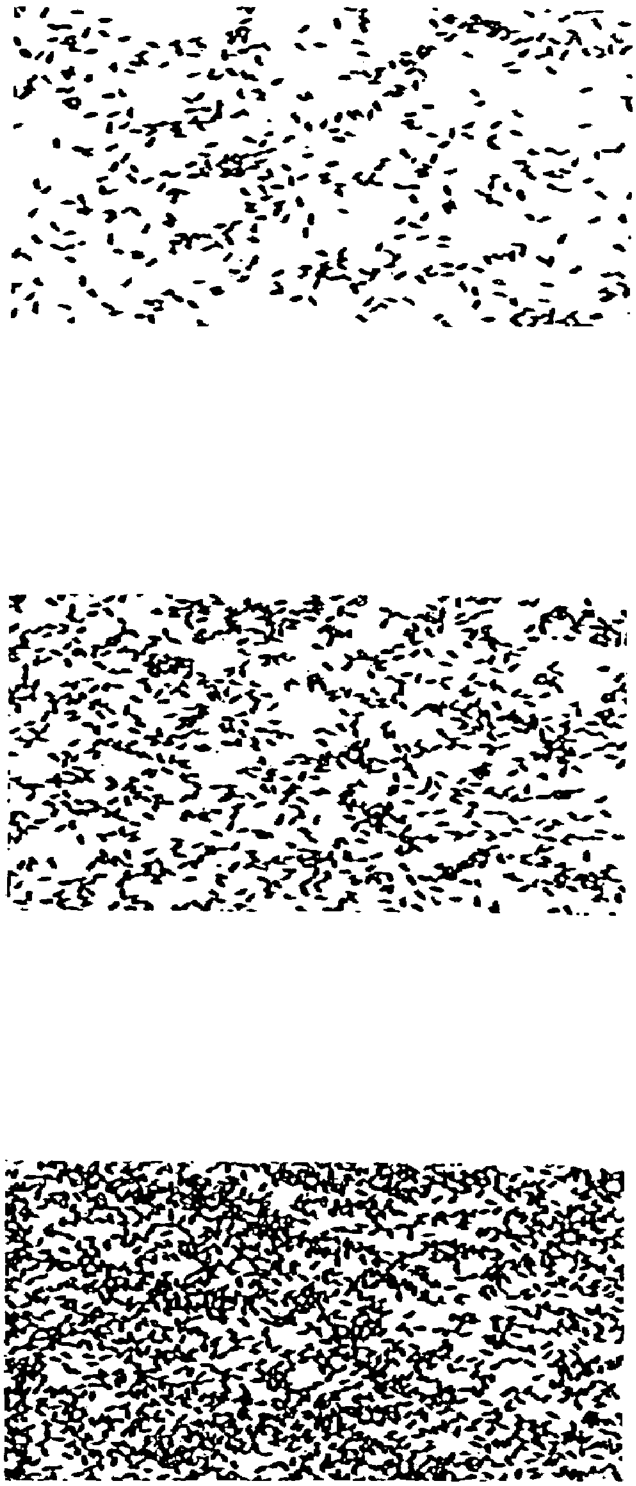
FIG. 2 shows a selection of images which are the basis for analysis in accordance with the invention.

FIG. 2 shows enhanced images of a portion of the bulk stream of rice flowing from a chute of the kind illustrated in FIG. 1, at different rates. FIG. 2A represents rice grains in free fall in a bulk stream 30 cms wide at a rate of around 1,000 Kg per hour. FIG. 2B is a similar image from a stream moving at a rate of around 2,000 Kg per hour. While each of these images would provide an excellent basis for analysis according to the present invention, the rate is often too low to be commercially acceptable. The image of FIG. 2C shows sufficient individual rice grains to provide the basis for assessment according to the invention, from a stream moving at a rate of around 3,500 Kg per hour. This is a broadly acceptable rate for the sorting of rice grains, and if this is the operating rate of a sorting machine, then analysis according to the present invention can be conducted without any flow rate reduction being necessary. However, if it is necessary to reduce the flow rate in a machine of the kind illustrated in FIG. 1, then this can be accomplished by controlling the operation of the vibrator 6. Of course, the invention can be practised with the bulk stream moving at any rate, up to the point at which the image mapping process can no longer identify any singulated particles, bearing in mind that the data generated is likely to be less accurate at higher rates of flow.

In analysing images of the kind illustrated in FIG. 2 and particularly FIG. 2C, individual or singulated rice grains are first identified. If the analysis is to be based only on such individually identified grains, then in the analysis the number of grains classified as broken will be the basis for the quality assessment. This figure may have to be adapted, according to the density of grains in the image, to account for the lower probability that smaller grains may touch. However, image processing technology using linescan cameras for example, can also identify touching objects and resolve the images thereof into separate elements or rice grains, thereby increasing the population upon which the analysis is based. However the individual or singulated rice grains are identified, they may be classified as either whole or broken grains by various known image processing techniques.

While the invention has been described above with particular reference to rice grains and their sorting. It will be appreciated that it may be used in the quality assessment of a stream of any bulk product in which individual product pieces are available for identification. It is particularly but not exclusively useful in the handling of food products, such as cereals, coffee, pulses and nuts.

The invention claimed is:

1. A method of generating data relating to the quality of product in a bulk stream of product during its passage through a monitoring station, wherein an inspection of a portion of product while within the bulk stream at the monitoring station is conducted at intervals while the stream is flowing, which portion includes touching or overlapping product pieces, the inspection identifying individual product pieces in said portion, examining only those individually identified pieces according to chosen first and second different criteria, and establishing a measure of the quantity or proportion of such individual product pieces that fail to meet said criteria, and wherein data generated by such inspections is analyzed to provide an indication of the quality of the bulk stream.

2. A method according to claim 1 wherein the bulk stream of product is in free flight during its passage through the monitoring station.

3. A method according to claim 1 wherein the bulk stream of product is on a conveyor belt during its passage through the monitoring station.

4. A method according claim 1 wherein the bulk stream of product is on a chute during its passage through the monitoring station.

5. A method according to claim 1 wherein the inspection is conducted while the bulk stream is at full flow rate.

6. A method of generating data relating to the quality of product in a bulk stream of product during its passage through a monitoring station, wherein an inspection of a portion of product while within the bulk stream at the monitoring station is conducted at intervals while the stream is flowing, which portion includes touching or overlapping product pieces, the inspection identifying individual product pieces in said portion, examining only those individually identified pieces according to chosen criteria, and establishing a measure of the quantity or proportion of such individual product pieces that fail to meet said criteria, and wherein data generated by such inspections is analyzed to provide an indication of the quality of the bulk stream, wherein the flow rate of the bulk stream is reduced for the period during which the inspection is conducted, and then returned to a higher flow rate after the inspection is completed.

7. A method according to claim 6 wherein the flow rate is reduced by up to 90% for the period during which the inspection is conducted.

8. A method according to claim 1 wherein the inspection is repeated at regular intervals.

9. A method according to claim 1 wherein the inspection comprises creating an image of the portion of product in the monitoring station and analyzing such images as aforesaid.

10. A method according to claim 9 wherein individual product pieces are identified by mapping outline profiles.

11. A method according to claim 10 wherein, when an outline profile identifies touching product pieces, the outline profile of an individual piece is derived therefrom.

12. A method according to claim 10 or claim 11 wherein individual pieces are identified with reference to at least one of area, deduced volume, or a continuous outline profile with no concavities.

13. A method according to claim 12 wherein individual pieces are identified with reference to linear dimensions using a linescan camera, and wherein a dimension in the direction of passage of the bulk stream through the monitoring station is calculated relative to the estimated speed of said passage, the linescan rate and the effective size of the pixels.

14. A method according to claim 13 wherein the length of individual pieces is determined with reference to a comparison of measurements taken along and transverse to said direction of passage.

15. A method according to claim 1 wherein the number of product pieces identified in an inspection as failing to meet said chosen criteria is used to estimate the proportion of such product pieces in the bulk stream of product.

16. A method according to claim 1 wherein one of the chosen criteria is breakage.

17. A method according to claim 1 wherein one of the chosen criteria is length.

18. A machine for sorting product in a stream of product in order to remove unacceptable product pieces from the stream, comprising:

a monitoring station that provides inspection data of the stream of product when flowing therethrough, a processor that receives the inspection data;

a sorting station responsive to an output of the processor to sort the product stream according to at least a first criterion to separate unacceptable and acceptable product pieces therein; and wherein the processor additionally processes the inspection data at intervals while the stream of product including touching or overlapping product pieces is flowing through the monitoring station, identifies individual product pieces from the touching or overlapping product pieces of the stream;

examines the identified individual pieces to provide an indication while the stream of product is flowing through the monitoring station of the quality of the stream of product pieces with respect to at least a second defined criterion, and analyzes the quality indication of the product pieces in the bulk stream.

19. The machine according to claim 18 wherein the monitoring station includes detectors for monitoring light received from around or reflected from the product in the stream and provide the inspection data to the processor.

20. A method according to claim 1 wherein the product in the bulk stream is rice.

21. A method according to claim 20 wherein the rice is in a product stream 30 cms wide and moving at a normal working flow rate of up to 10,000 kg/hr.

22. A method according to claim 10 wherein, when an outline profile identifies overlapping product pieces, the outline profile of an individual piece is derived therefrom.

23. A method according to claim 22 wherein individual pieces are identified with reference to at least one of area, deduced volume, or a continuous outline profile with no concavities.

24. A method according to claim 23 wherein individual pieces are identified with reference to linear dimensions using a linescan camera, and wherein a dimension in the direction of passage of the bulk stream through the monitoring station is calculated relative to the estimated speed of said passage, the linescan rate and the effective size of the pixels.

25. A method according to claim 24 wherein the length of individual pieces is determined with reference to a comparison of measurements taken along and transverse to said direction of passage.

26. A method of monitoring a stream of solid product pieces passing through a monitoring station, comprising:

at intervals while the stream of product pieces is flowing, inspecting at least a portion of the product within the stream, which portion includes touching or overlapping product pieces;

identifying individual product pieces in said portion;

examining the identified individual pieces to generate inspection data;

analyzing the inspection data to provide an indication while the stream of product is flowing through the monitoring station of the quality of the stream of product pieces with respect to at least a first defined criterion; and sorting product pieces in the product stream according to at least a second defined criterion to separate unacceptable and acceptable product pieces therein.

27. The method according to claim 26, wherein the first and second criterion are the same.

28. A method of monitoring a stream of solid product pieces passing through a monitoring station, comprising:

at intervals while the stream of product pieces is flowing, inspecting at least a portion of the product within the stream, which portion includes touching or overlapping product pieces;

identifying individual product pieces in said portion;

examining the identified individual pieces to generate inspection data;

analyzing the inspection data to provide an indication of the quality of the stream of product pieces with respect to at least a first defined criterion; and sorting product pieces in the product stream according to at least a second defined criterion to separate unacceptable and acceptable product pieces therein;

wherein the first and second criterion are different.

29. The method according to claim 28, wherein the first criterion includes identifying a proportion of broken product pieces in the stream.

30. The method according to claim 29, wherein the second criterion includes identifying discolored pieces and sorting includes removing the discolored product pieces from the stream.

31. The method according to claim 28, wherein the first criterion includes identifying a proportion of undersized product pieces in the stream.

32. The method according to claim 31, wherein the second criterion includes identifying discolored pieces and sorting includes removing the discolored product pieces from the stream.

33. The method according to claim 28, wherein the first criterion includes identifying a proportion of mis-shapen product pieces in the stream.

34. The method according to claim 33, wherein the second criterion includes identifying discolored pieces and sorting includes removing the discolored product pieces from the stream.

35. The method according to claim 26, wherein the second criterion includes identifying discolored pieces and sorting includes removing the discolored product pieces from the stream.

36. The method according to claim 26, wherein the product pieces include rice grains.

37. The method according to claim 26, wherein the stream of product pieces is in free flight during its passage through the monitoring station.

38. The method according to claim 26, wherein the stream of product pieces is on a conveyor belt during its passage through the monitoring station.

39. The method according to claim 26, wherein the stream of product pieces is on a chute during its passage through the monitoring station.

40. The method according to claim 26, wherein sorting product pieces includes ejecting the unacceptable product pieces from the product stream.

41. The method according to claim 26, wherein a rate of flow of the product pieces through the monitoring station is reduced by an amount up to 90% during a period in which the individual pieces are examined to generate inspection data, and then returned to a higher rate of flow after the inspection is completed.

42. A method of assessing the quality of solid product pieces passing through a monitoring station as a stream of product pieces, comprising:

moving the stream of product pieces through the monitoring station at a given flow rate;

sorting product pieces in the product stream to remove unacceptable product pieces therefrom at least while the stream is moving at the given flow rate;

intermittently reducing the flow rate of the product pieces through the monitoring station to less than the given flow rate;

examining individual pieces of product while at the reduced flow rate to generate inspection data; and analyzing the inspection data to establish a measure of the quality of the stream of individual product pieces.

43. The method of claim 42, wherein the reduced flow rate is up to 90% less than the given flow rate.

44. Method of assessing the quality of solid product pieces passing through a monitoring station as a stream of product pieces, comprising:

moving the stream of product pieces through the monitoring station at a given flow rate;

sorting product pieces in the product stream to remove unacceptable product pieces therefrom at least while the stream is moving at the given flow rate;

intermittently reducing the flow rate of the product pieces through the monitoring station to less than the given flow rate;

examining individual pieces of product while at the reduced flow rate to generate inspection data; and analyzing the inspection data to establish a measure of the quality of the stream of individual product pieces;

wherein sorting product pieces includes sorting the product pieces according to at least one defined criterion, and wherein analyzing the inspection data includes analyzing the inspection data according to at least another defined criterion that is different than the one defined criterion.

45. The method according to claim 44, wherein the one criterion includes identifying discolored pieces and sorting includes removing the discolored product pieces from the stream.

46. The method according to claim 44, wherein the other criterion includes identifying a proportion of product pieces that are broken, undersized or mis-shapen.

47. A method of sorting product in a bulk stream of product, comprising the method of claim 1 wherein establishing a measure includes establishing a measure of the quantity or proportion of such individual product pieces that fail to meet the first criterion, and wherein the method of sorting comprises sorting the product pieces in the bulk stream according to the second criterion in order to remove unacceptable product pieces from the bulk stream.

48. The method according to claim 28, wherein a rate of flow of the product pieces through the monitoring station is reduced by an amount up to 90% during a period in which the individual pieces are examined to generate inspection data.

49. The method according to claim 42, wherein the stream of product pieces include touching or overlapping product pieces, and wherein the method additionally comprises, prior to examining individual pieces of product, identifying individual product pieces of the stream while at the reduced flow rate.

50. The method according to claim 42, wherein sorting product pieces in the product stream to remove unacceptable product pieces therefrom occurs at least while the stream is moving at the given flow rate and at a given speed, and wherein intermittently reducing the flow rate of the product pieces through the monitoring station occurs while maintaining the given speed of the product pieces through the monitoring station.

* * * * *